United States Patent
Mulvihill et al.

(10) Patent No.: US 6,516,370 B1
(45) Date of Patent: Feb. 4, 2003

(54) DATA STORAGE SYSTEM

(75) Inventors: Timothy Mulvihill, Lakeville, MA (US); Andrew Wrobel, Millbury, MA (US); John Quinn, Berlin, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/474,284

(22) Filed: Dec. 29, 1999

(51) Int. Cl.$^7$ .......................... G06F 13/14; G06F 13/42; G06F 13/40

(52) U.S. Cl. ...................... 710/126; 710/128; 710/129; 710/106; 710/131; 710/38; 711/111; 711/112; 711/114

(58) Field of Search ................................. 710/126, 128, 710/129, 106, 131, 38; 711/111, 112, 114

(56) References Cited

U.S. PATENT DOCUMENTS

| | | | | |
|---|---|---|---|---|
| 5,206,939 A | | 4/1993 | Yanai et al. ..................... | 711/4 |
| 5,524,236 A | * | 6/1996 | Ostrowski ..................... | 703/24 |
| 5,925,120 A | * | 7/1999 | Arp et al. ..................... | 710/300 |
| 5,978,877 A | * | 11/1999 | Strevey ....................... | 710/314 |
| 6,070,211 A | * | 5/2000 | Neal et al. .................... | 710/106 |
| 6,389,494 B1 | * | 5/2002 | Walton et al. .............. | 710/317 |

OTHER PUBLICATIONS

IBM–TDB, "Small Computer System Interface Single Ended to Differential Adapter", vol. 36, No. 11, Nov. 1, 1993.*

* cited by examiner

Primary Examiner—Jeffrey Gaffin
Assistant Examiner—Tammara Peyton

(74) Attorney, Agent, or Firm—Daly, Crowley & Mofford, LLP.

(57) ABSTRACT

A system for coupling data between a host computer and a bank of disk drives. The system includes a plurality of directors for controlling the flow of the data between host computer and the bank of disk drives. Each one of the directors has a primary port and a secondary port. The system includes a first I/O section coupled to a first one of a pair of disk drive sections in the bank of disk drives and a second I/O section coupled to a second one of the pair of disk drive sections in the bank of disk drives. A backplane is provided for electrically interconnecting: the primary port of a first one of a pair of the directors to the first I/O section through a first differential data bus; the secondary port of the first one of the pair of directors to the second I/O section through a first single ended data bus; the primary port of a second one of the pair of directors to the second I/O section through a second differential data bus; and, the secondary port of the second one of the pair of directors to the first I/O section through a second single ended data bus. Each one of the first and second I/O sections includes a single ended/differential data bus converter. The converter of the first I/O section is coupled between the second single ended data bus and the first differential data bus and the converter of the second I/O section is coupled between the first single ended data bus and the second differential data bus. Each one of the directors in the pair thereof includes a processor for, during a normal operating mode, coupling data between such processor and a corresponding one of the pair of disk drive sections through a corresponding one of the first and second differential buses. In the event of a fault in the first one of the pair of directors, data is coupled between the second one of the pair of directors and the first one of the pair of disk drive sections through the second single ended data bus to a first one of the pair of single ended/differential data bus converters to the first differential data bus and the first one of the disk drive sections through the first differential data bus.

4 Claims, 4 Drawing Sheets

DATA STORAGE SYSTEM

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe, or host, computer systems require large capacity data storage systems. These large mainframe, or host computer systems generally include data processors, which perform many operations on data introduced to the computer system through peripherals including the data storage system. The results of these operations are output to peripherals, including the storage system.

One type of data storage system is a magnetic disk storage system. Here, a bank of disk drives and the mainframe, or host computer system are coupled together through a system interface. The system interface includes Central Processing Unit (CPU), or "front end", controllers (or directors) and "back end" disk controllers (or directors). The system interface operates the controllers (or directors) in such a way that they are transparent to the computer. That is, data is stored in, and retrieved from, the bank of disk drives in such a way that the mainframe, or host computer system merely thinks it is operating with one mainframe, or host memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the system interface may also include, in addition to the CPU controllers (or directors) and disk controllers (or directors), addressable cache memories. The cache memory is a semiconductor memory and is provided to rapidly store data from the mainframe computer system before storage in the disk drives, and, on the other hand, store data from the disk drives prior to being sent to the mainframe computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has one, or more, pairs of buses. One section of the disk controllers is connected to one or more of the buses and another section of the disk controllers is connected to one or more of the other buses. Likewise, one set of the CPU controllers is connected to one or more of the buses and another set of the CPU controllers is connected to one or more of the other buses. The cache memories are connected to all of the buses. Each one of the buses provides data, address and control information.

Thus, the use of two, or more, buses provides a degree of redundancy to protect against a total system failure in the event that the controllers, or disk drives connected to one bus fail. Further, the use of two, or more, buses increases the data transfer bandwidth of the system compared to a system having a single bus.

As is also known in the art, one type of system interface includes a backplane having directors plugged into one surface of the backplane and Input/Output (I/O) adapters plugged into an opposite surface of the backplane. The backplane is a printed circuit board used to properly interconnect the directors and the I/O adapters. One portion of the I/O adapters is connected by cables to the host computer and another portion are connected to the disk drives. In some systems Small Computer Signal Interface (SCSI) data busses are used in the cables to transfer data through the system interface (from I/O adapters plugged into the backplane) to the bank of disk drives. One type of SCSI bus is a single-ended SCSI data bus. Such single-ended SCSI bus is typically in a cable having a grounded conductor and a single conductor. Another type of SCSI data bus is a differential SCSI bus, e.g., Low Voltage Differential (LVD) SCSI. Such differential SCSI data buses have a pair of conductors within the cable. While the differential SCSI bus offers the advantage of greater isolation from external noise and is able to carry data faster than single-ended SCSI data buses, the differential SCSI bus requires twice as may connector pins as the single-ended SCSI data bus thereby making its use limited to backplanes which can accommodate the extra connector pins.

SUMMARY OF THE INVENTION

In accordance with the present invention, a system is provided for coupling data between a host computer and a bank of disk drives. The system includes a plurality of directors for controlling the flow of the data between host computer and the bank of disk drives. Each one of the directors has a primary port and a secondary port. The system includes a first I/O section coupled to a first one of a pair of disk drive sections in the bank of disk drives and a second I/O section coupled to a second one of the pair of disk drive sections in the bank of disk drives. A backplane is provided for electrically interconnecting: the primary port of a first one of a pair of the directors to the first I/O section through a first differential data bus; the secondary port of the first one of the pair of directors to the second I/O section through a first single-ended data bus; the primary port of a second one of the pair of directors to the second I/O section through a second differential data bus; and, the secondary port of the second one of the pair of directors to the first I/O section through a second single-ended data bus. Each one of the first and second I/O sections includes a single-ended/differential data bus converter. The converter of the first I/O section is coupled between the second single-ended data bus and the first differential data bus and the converter of the second I/O section is coupled between the first single-ended data bus and the second differential data bus.

In one embodiment, each one of the directors in the pair thereof includes a processor for, during a normal operating mode, coupling data between such processor and a corresponding one of the pair of disk drive sections through a corresponding one of the first and second differential buses. In the event of a fault in the first one of the pair of directors, data is coupled between the second one of the pair of directors and the first one of the pair of disk drive sections through: the second single-ended data bus; a first one of the pair of single-ended/differential data bus converters; and the first differential data bus. Further, during the fault, data continues to be coupled between the second one of the pair of directors and the second one of the disk drive sections through the second differential data bus.

With such an arrangement, the number of connector pins required at the backplane is reduced while still enabling differential SCSI data transfers between the host computer and the bank of disk drives during the normal operating mode. However, in the event of a failure of one of a pair of directors, enabling differential SCSI data to be transferred between the backplane and the bank of disk drives with single-ended SCSI data being transferred only through the shorter, more isolated backplane only when the secondary bus is activated.

In one embodiment of the invention, a data storage system is provided having a host computer; a bank of disk drives comprising a plurality of disk drive sections; and a system interface for coupling data between the host computer and the bank of disk drives. The system interface includes a backplane; a plurality of directors connected to front side connectors of the backplane; and an I/O interface connected to rear side connectors of the backplane. The directors are adapted to control the flow of the data between host computer and the bank of disk drives. Each one of the directors has a primary port and a secondary port connected to the front side connectors of the backplane. The I/O interface has a first section and a second section. The first section of the I/O interface is coupled to a first one of a pair of disk drive sections and the second section of the I/O interface is coupled to a second one of the pair of disk drive sections. The backplane electrically interconnects: the primary port of a first one of a pair of the directors to the first section of the I/O interface through a first differential SCSI data bus; the secondary port of the first one of the pair of directors to the second section of the I/O interface through a first single-ended SCSI data bus; the primary port of a second one of the pair of directors to the second section of the I/O interface through a second differential SCSI data bus; and, the secondary port of the second one of the pair of directors to the first section of the I/O interface through a second single-ended SCSI data bus. Each one of the first and second sections of the I/O interface includes a single-ended/differential SCSI data bus converter. The converter of the first section of the I/O interface is coupled between the second single-ended SCSI data bus and the first differential SCSI data bus. The converter of the second section of the I/O interface is coupled between the first single-ended SCSI data bus and the second differential SCSI data bus. In one embodiment, a system interface is provided for coupling data between a host computer and a bank of disk drives. The interface includes: a backplane; a plurality of directors connected to one side of the backplane; and an I/O interface connected to an opposite side of the backplane. The directors are adapted to control the flow of the data between host computer and the bank of disk drives. Each one of the directors has a primary port and a secondary port connected to the front side of the backplane. The I/O interface has a first section coupled to the first one of the pair of disk drive sections and a second section coupled to the second one of the pair of disk drive sections. The backplane electrically interconnects: the primary port of a first one of a pair of the directors to the first section of the I/O interface through a first differential SCSI data bus; the secondary port of the first one of the pair of directors to the second section of the I/O interface through a first single-ended SCSI data bus; the primary port of a second one of the pair of directors to the second section of the I/O interface through a second differential SCSI data bus; and, the secondary port of the second one of the pair of directors to the first section of the I/O interface through a second single-ended SCSI data bus. Each one of the first and second sections of the I/O interface includes a single-ended/differential SCSI data bus converter, the converter of the first section of the I/O interface being coupled between the second single ended SCSI data bus and the first differential SCSI data bus and the converter of the second section of the I/O interface being coupled between the first single ended SCSI data bus and the second differential SCSI data bus.

BRIEF DESCRIPTION OF THE DRAWINGS

These and other features of the invention, as well as the invention itself, will become more readily apparent from the following detailed description when read together with the accompanying drawings, in which.

DESCRIPTION OF THE PREFERRED EMBODIMENTS

Figure 1:
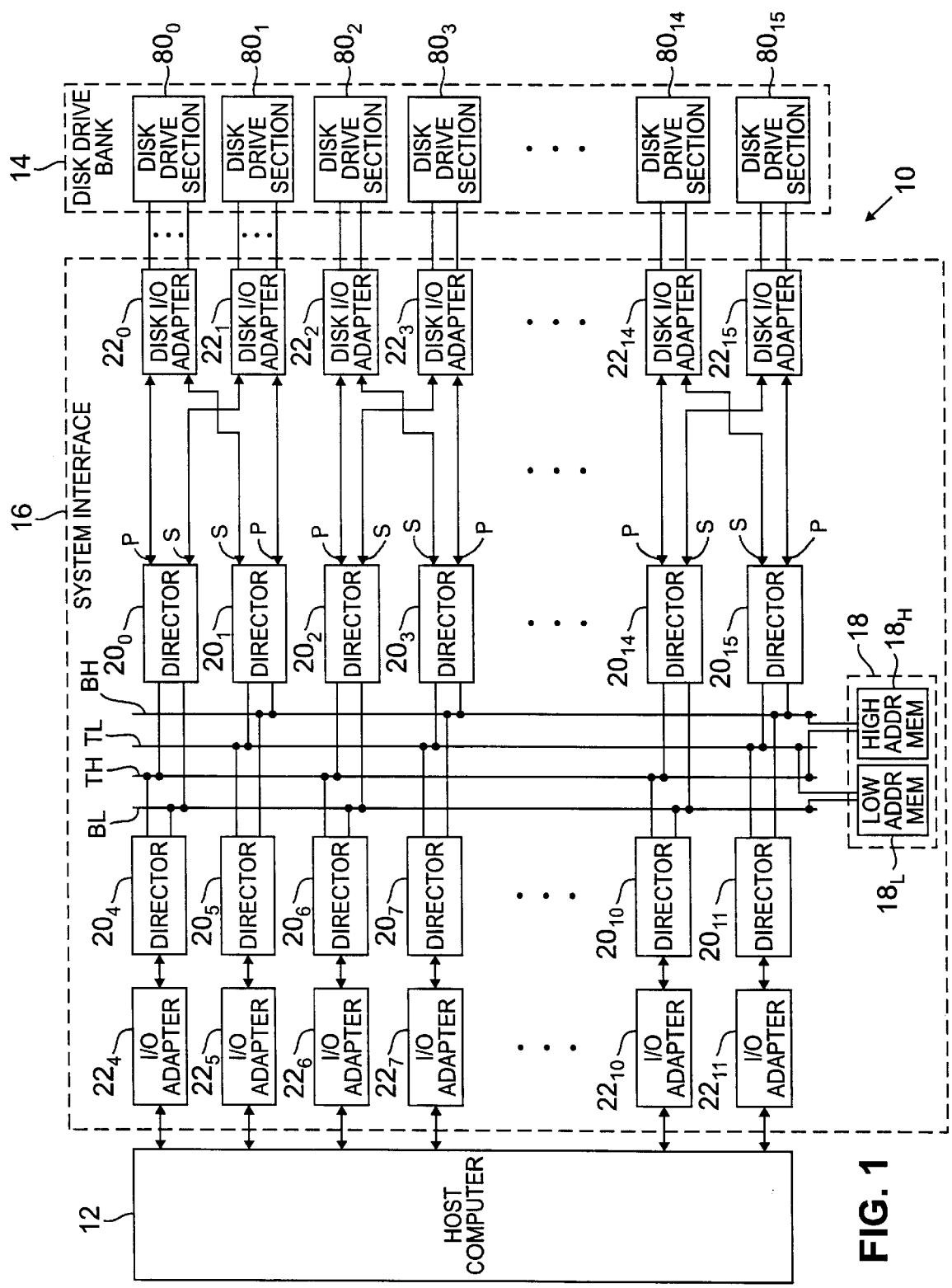
FIG. 1 is a block diagram of a data storage system according to the invention.

Referring now to FIG. 1, a data storage system 10 is shown wherein a host computer 12 is coupled to a bank 14 of disk drives through a system interface 16. The system interface 16 includes a cache memory 18, having a high memory address section 18H and a low address memory section 18L. A plurality of directors $20_0$–$20_{15}$ is provided for controlling data transfer between the host computer 12 and the bank 14 of disk drives as such data passes through the cache memory 18. A pair of high address busses TH, BH is electrically connected to the high address memory sections 18H. A pair of low address busses TL, BL electrically connected to the low address memory sections 18L. The cache memory 18 has a plurality of storage location addresses. Here, the storage locations having the higher addresses are in the high address memory sections 18H and the storage locations having the lower addresses are in the low address memory sections 18L. It should be noted that each one of the directors $20_0$–$20_{15}$ is electrically connected to one of the pair of address busses TH, BL and one to the other of the pair of address busses TL, BH, as indicated. It is also noted that each one of the directors $20_0$–$20_{15}$ is able to address all locations in the entire cache memory 18 (i.e., to both the high address memory section 18H and the low address memory section 18L) and is therefore able to store data in and retrieve data from any storage location in the entire cache memory 18.

More particularly, a rear-end portion of the directors, here directors $20_0$–$20_3$ and $20_{12}$–$20_{15}$, (only $20_0$–$20_3$ and $20_{14}$ and $20_{15}$ being shown) is electrically connected to the bank 14 of disk drives through I/O sections, here I/O adapter cards $22_0$–$22_3$ and $22_{12}$–$22_{15}$ (only $22_0$–$22_3$ and $22_{14}$ and $22_{15}$ being shown) and a front-end portion of the directors, here directors $20_4$–$20_{11}$, is electrically connected to the host computer 12 through I/O adapter cards $22_4$–$22_{11}$. In operation, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low memory address bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the rear-end directors $20_0$–$20_3$ and $20_{12}$–$20_{15}$ is to handle this request. The Table maps the host computer 12 addresses into an address in the bank 14 of disk drives. The front-end director then puts a notification in a "mail box" (not shown and stored in the cache memory 18) for the rear-end director which is to handle the request, the amount of the data and the disk address for the data. Other rear-end directors poll the cache memory 18 when they are idle to check their "mail boxes". If the polled "mail box" indicates a transfer is to be made, the rear-end director processes the request, addresses the disk drive in the bank, reads the data from the cache memory and writes it into the addresses of a disk drive in the bank 14. When data is to be read from the disk drive to the host computer 12 the system operates in a reciprocal manner.

Figure 2:
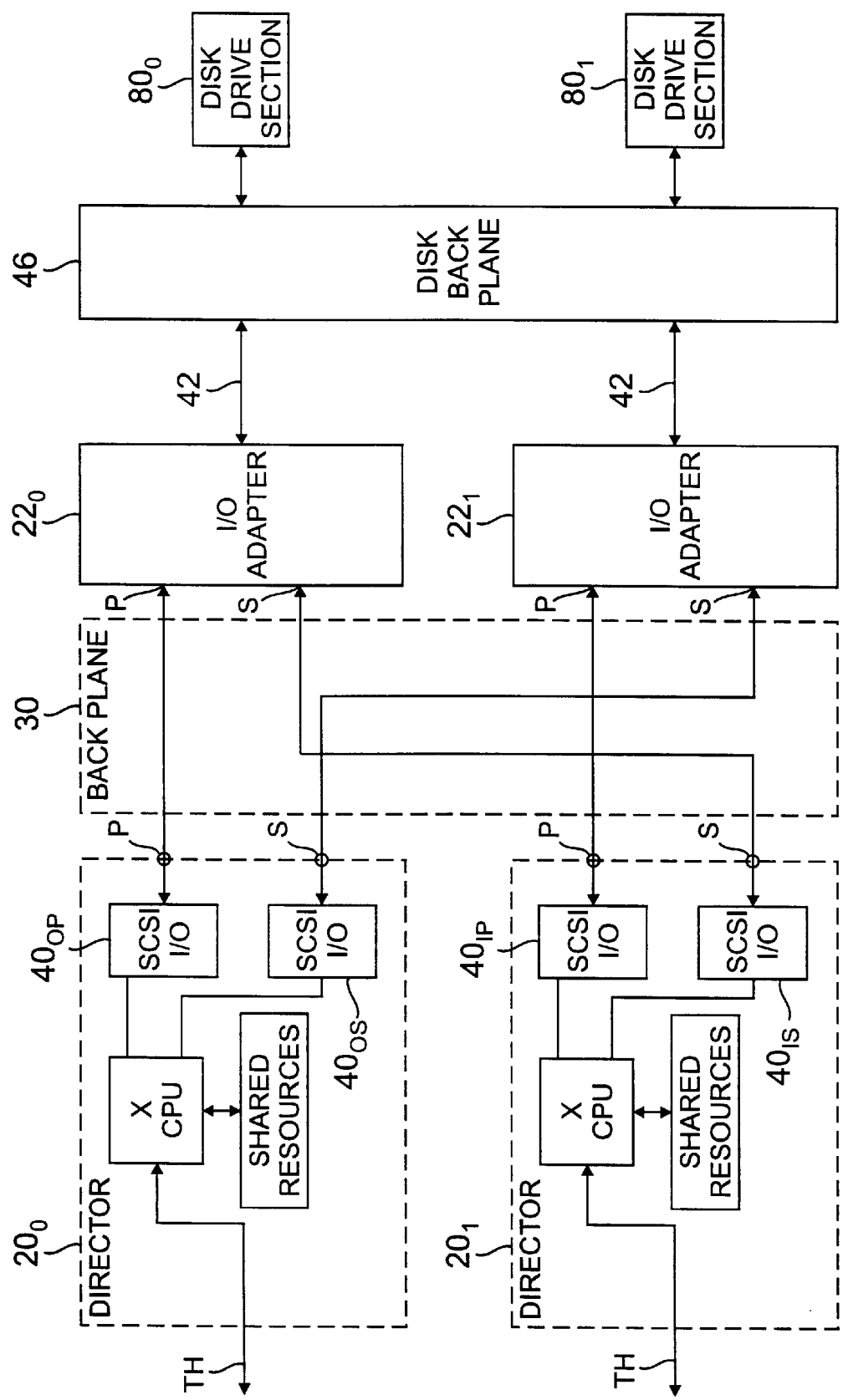
FIG. 2 is a diagrammatical sketch showing a system interface of the data storage system of FIG. 1 such sketch showing a plurality of directors and I/O adapters plugged into an interface backplane and the I/O adapters coupled to a disk backplane having plugged therein a plurality of disk drives according to the invention.
Figure 3:
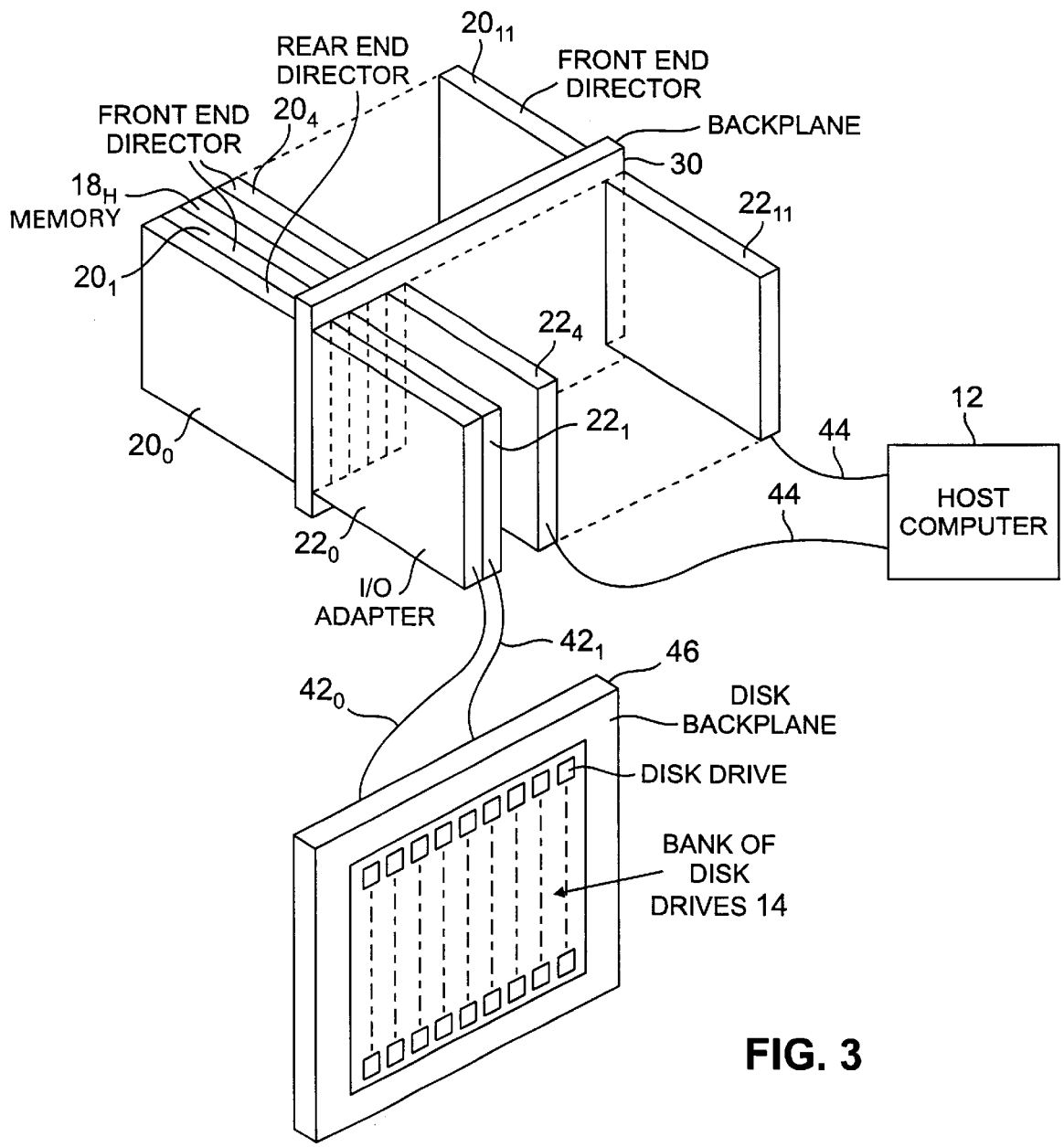
FIG. 3 is a block diagram of a pair of the directors of the data storage system of FIG. 1 coupled to a pair of the I/O adapters through the backplane and a pair of disk drive sections coupled to the backplane through the disk backplane through a pair of the I/O adapters according to the invention.

Each one of the rear-end portion of the directors $20_0$–$20_3$, $20_{12}$–$20_{15}$ is identical in construction, portions of an exemplary pair thereof, here rear-end directors $20_0$, $20_1$, being shown in FIG. 2. Thus, each one of the rear-end portions of the directors $20_0$–$20_3$, $20_{12}$–$20_{15}$ is shown to include a central processing section, CPU X and additional resources (Flash memories, etc,) arranged as shown. The exemplary pair of directors $20_0$, $20_1$, are shown in FIG. 2 to be coupled to the bank 14 of disk drives (FIG. 1) through I/O adapter cards $22_0$, $22_1$, respectively, via a system backplane 30, as indicated in FIG. 2. As discussed above in connection with FIG. 1, both the front-end portion and rear end portion of the directors are connected to the busses TH, TL, BH, BL through the backplane 30, as indicated in FIGS. 2 and 3.

As noted above in connection with FIG. 1, a front-end portion of the directors $20_4$–$20_{11}$ is coupled to the host computer 12 and rear-end portion of the directors $20_0$–$20_3$ and $20_{12}$–$20_{15}$ is coupled to the disk drive bank 14. The bank 14 of disk drives has a plurality of disk drive sections $80_0$–$80_3$ and $80_{12}$–$80_{15}$ (FIG. 1) of electrically connected disk drives.

Each one of the rear-end directors $20_0$–$20_3$ and $20_{12}$–$20_{15}$ has a pair of ports; i.e. a primary port P and a secondary port S. Each one of the sections $80_0$–$80_3$ and $80_{12}$–$80_{15}$ of disk drives is connected to the primary port P and to the secondary port S of a pair of the rear-end directors, as indicated in FIGS. 1 and 2, for an exemplary pair of the rear end portions of the directors, here the pair of rear-end directors $20_0$ and $20_1$. Thus, for redundancy, two different rear-end directors are able to communicate with any one sections of disk drives, as shown. Thus, for example, section $80_0$ (FIGS. 1 and 2) is coupled to the primary port P of rear-end director $20_0$ and, for redundancy in case there is a failure in director $20_0$, section $80_0$ is also connected to the secondary port S of director $20_1$. Likewise, section $80_1$ (FIGS. 1 and 2) is coupled to the primary port P of rear-end director $20_1$ and, for redundancy in case there is a failure in director $20_1$, section $80_1$ is also connected to the secondary port S of director $20_0$. Further, as shown in FIG. 1, directors $20_0$ and $20_1$ are on different sets of busses (i.e., busses TH and BL for director $20_0$ and busses TL and BH for director $20_1$) for additional redundancy.

More particularly, and referring to FIG. 2, the X CPU of director $20_0$ is connected to a pair of Small Computer Signal Interface (SCSI) Input/Output (I/O) initiator chips, here a primary SCSI I/O $40_{0P}$ and a secondary SCSI I/O $40_{0S}$, as indicated. The primary SCSI I/O $40_{0P}$ is connected to the primary port P of director $20_0$ and the secondary SCSI I/O $40_{0S}$ is connected to the secondary port S of the director $20_0$, as indicated. In like manner, the X CPU of director $20_1$ is connected to a primary SCSI I/O $40_{1P}$ and a secondary SCSI I/O $40_{1S}$ as indicated. The primary SCSI I/O $40_{1P}$ is connected to the primary port P of director $20_1$ and the secondary SCSI I/O $40_{1S}$ is connected to the secondary port S of the director $20_1$, as indicated. As shown in FIG. 3, the directors $20_0$–$20_{11}$ and the memories 18H and 18L plug into the front surface of the backplane 30 (a printed circuit board) and the I/O adapter cards $22_0$–$22_{11}$ plug into the rear surface of the backplane 30. The rear I/O adapter cards $22_0$–$22_3$ and $22_{12}$–$22_{15}$ then connect into the bank of disk drives 14 through cables 42 and a disk backplane 46 (also a printed circuit board), as indicated while the front I/O adapter cards $22_4$–$22_{11}$ connect to the host computer 12 through cables 44, as indicated.

Figure 4:
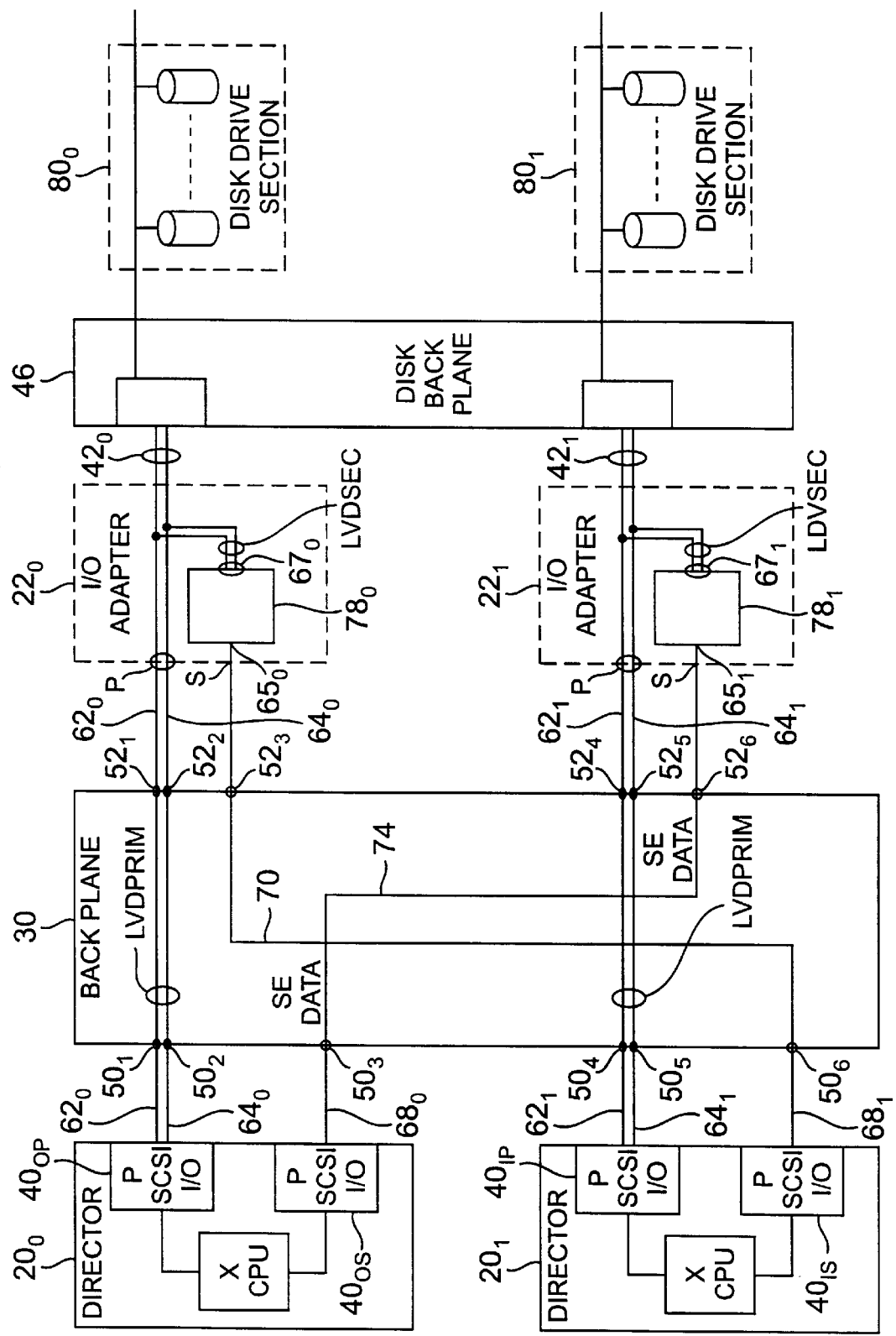
FIG. 4 is a more detailed block diagram of the pair of the directors of the data storage system of FIG. 1 coupled to the pair of the I/O adapters thorough the backplane and the pair of disk drive sections coupled to the backplane through the disk backplane through the pair of the I/O adapters according to the invention.

More particularly, and referring also to FIG. 4, the backplane 30 has a front set of connector pins $50_1$–$50_6$ and a rear set of connector pins $52_1$–$52_6$. As noted above in connection with FIG. 3, the directors $20_0$–$20_{15}$ plug into the pins of the front side of the backplane 30 and the I/O adapters plug into the pins on the rear side of the backplane 30. Thus, the backplane 30 has sometimes been referred to as a "midplane".

Director $20_0$ (FIG. 4) includes a pair of Low Voltage Differential Primary (LVD PRIM) SCSI conductors $62_0$, $64_0$ which plug into pins $50_1$, $50_2$, respectively, and a single-ended SCSI data (SE DATA) conductor $68_0$ which plugs into pin $50_3$. Directors $20_1$ includes a pair of Low Voltage Differential Primary (LVD PRIM) SCSI conductors $62_1$, $64_1$ which plug into pins $50_4$, $50_5$, respectively, and a single-ended SCSI data (SE DATA) conductor $68_1$ which plugs into pin $50_6$. It is first noted that the cable for each single-ended conductor $68_0$, $68_1$ has a grounded conductor (not shown). Thus, while the single-ended conductor $68_0$, $68_1$ are each connected to corresponding single conductor pins $50_3$ $50_6$, respectively, of the backplane 30 on the front side conductors of the backplane 30, the signals on these single-ended conductors $68_0$, $68_1$ have signal returns through the grounded conductor (not shown). On the other hand, the LVD PRIM conductors $62_0$, $62_1$ and $64_0$, $64_1$ are each a pair of non-grounded conductors and each pair is used to transmit a differential (LVD) SCSI signal.

More particularly, the LVD PRIM conductors $62_0$, $64_0$ have one end thereof connected to the primary SCSI I/O $40_{0P}$ (i.e., to:the primary port P of the directors $20_0$) and the other end thereof connected to pins $50_1$, $50_2$, respectively, on the front side of the backplane 30. The LVD PRIM conductors $62_1$, $64_1$ have one end thereof connected to the primary SCSI I/O $40_{1P}$, (i.e., to the primary port P of the directors $20_1$) and the other end thereof connected to pins $50_4$, $50_5$, respectively, on the front side of the backplane 30. The single-ended conductor $68_0$ has one end thereof connected to the secondary SCSI I/O $40_{0S}$, (i.e., to the secondary port S of the director $20_0$) and the other end thereof connected to pin $50_3$ on the front side of the backplane 30. The single-ended conductor $68_1$ has one end thereof connected to the SCSI I/O $40_{1S}$ (i.e., to the secondary port S of the director $20_1$) and the other end thereof to pin $50_6$ on the front side of the backplane 30.

The backplane 30 has conductors 70 and 74. Conductor 70 connects the single-ended conductor $68_1$ at pin $50_6$ (which is connected to the X CPU of director $20_1$ through the secondary SCSI I/O $40_{1S}$) to pin $52_3$ on the back side of the backplane 30. Conductor 74 connects the single-ended conductor $68_0$ at pin $50_3$ (which is connected to the X CPU of director $20_0$ through the secondary SCSI I/O $40_{0S}$) to pin $52_6$ on the back side of the backplane 30. It is noted that the pins $50_1$ and $50_2$ on the front side of the backplane 30 are connected directly to pins $52_1$ and $52_2$, respectively, on the back side of the backplane 30. Further, the pins $50_4$ and $50_5$ on the front side of the backplane 30 are connected directly to pins $52_4$ and $52_5$, respectively, on the back side of the backplane 30.

The I/O adapters $22_0$ and $22_1$ are plugged into the pins $52_1$–$52_6$ on the backside of the backplane 30. Each one of the I/O adapters $22_0$, $22_1$ includes a single-ended to differential converter $78_0$, $78_1$, respectively. Each one of the single-ended to differential converters (i.e., single-ended /differential converters) $78_0$, $78_1$ is identical and is here a Symbios Sym53C140 which converts between single-ended SCSI data signals at single ports $65_0$, $65_1$, respectively, thereof and differential SCSI data signals (LVD SEC) at a LVD ports $67_0$, $67_1$, respectively, thereof. That is, the converters are reciprocal devices so that LVD data at LVD port $67_0$, for example, is converted into single-ended data at single-ended port $65_0$, while single-ended data at single-ended port $65_0$ is converted into LVD data at LVD port $67_0$.

The primary port P of the I/O adapter $22_0$ includes a pair of pins which plug into the pins $52_1$ and $52_2$ on the back side of the backplane 30. These pins $52_1$ and $52_2$ are connected to the primary port P of the I/O adapter $22_0$ and to the pair of LVD ports $67_0$ of the converter $78_0$, as indicated. It is noted that the cable $42_0$ (one of the cables 42) connects the differential signals (LVD signals) on pins $52_1$ and $52_2$ or at the LVD pins $67_0$ to the disk backplane 46 and then to the disk drives in the disk drive section $80_0$. As noted above, because of the reciprocal nature of the converter $78_0$, data in disk drive section $80_0$ is fed via cable $42_0$ as LVD data to the pins $52_1$, $52_2$ on the back side of the backplane 30 and then through the backplane 30 to the pins $50_1$, $50_2$, on the front side of backplane 30 to the primary SCSI I/O $40_{0P}$.

In like manner, the primary port P of the I/O adapter $22_1$ includes a pair of pins which plug into the pins $52_4$ and $52_5$ on the back side of the backplane 30. These pins $52_4$ and $52_5$ are connected to the primary port P of the I/O adapter $22_1$ and to the pair of LVD ports $67_1$ of the converter $78_1$, as indicated. It is noted that the cable $42_1$ (another one of the cables 42) connects the differential signals (LVD signals) on pins $52_4$ and $52_5$ or at LVD pins $67_1$ to the disk backplane 46 and then to the disk drives in the disk drive section $80_1$. As noted above, because of the reciprocal nature of the converter $78_1$, data in disk drive section $80_1$ is fed via cable $42_1$ as LVD data to the pins $52_4$, $52_5$ on the back side of the backplane 30 and then through the backplane 30 to the pins $50_4$, $50_5$, on the front side of backplane 30 to the primary SCSI I/O $40_{1P}$. Thus, during normal operation, data is transmitted between the directors $20_0$ and $20_1$ and the disk drive sections $80_0$ and $80_1$, respectively, through the LVD PRIM conductors $62_0$, $64_0$ and LVD PRIM conductors $62_1$, $64_1$, respectively (i.e., as differential SCSI data). However, in the event of a failure in one of the pair of directors $20_0$, $20_1$ for example director $20_0$, data from the secondary SCSI I/O $40_{1S}$ will pass between through the backplane 30 between director $20_1$ and I/O adapter $22_0$ using the single-ended SE DATA conductor 70. The single-ended data will then be converted to differential data at LVD ports $67_0$ by converter $78_0$. The then differential data at LVD ports $67_0$ will pass between the backplane 30 and the disk drive section $80_0$ as differential data on the differential cable $42_0$. Reciprocally, differential data from the disk drive section $80_0$ will pass to LVD ports $67_0$ of converter $78_0$. The differential data at LVD ports $67_0$ will be converted into single-ended data by converter $78_0$ and thus appear as single-ended data at the secondary port S of I/O adapter $22_0$. The single-ended data will then pass through conductor 70 in the backplane 30 to the secondary SCSI I/O $40_{1S}$ of director $20_1$.

Considering now a failure in director $20_1$, data from the secondary SCSI I/O $40_{0S}$ will pass through the backplane 30 between director $20_0$ and I/O adapter $22_1$ using the single-ended SE DATA conductor 74. The single-ended data on conductor 74 will then be converted to differential data at LVD ports $67_1$ by converter $78_1$. The then differential data at LVD ports $67_1$ will pass between the backplane 30 and the disk drive section $80_1$ as differential data on the differential cable $42_1$. Reciprocally, differential data from the disk drive section $80_1$ will pass to LVD ports $67_1$ of converter $78_1$. The differential data at LVD ports $67_1$ will be converted into single-ended data by converter $78_1$ and thus appear as single-ended data at the secondary port S of I/O adapter $22_1$. The single-ended data will then pass through conductor 74 in the backplane 30 to the secondary SCSI I/O $40_{0S}$ of director $20_0$.

With such an arrangement, the number of connector pins required at the backplane 30 is reduced (i.e., only a single pins $50_3$, $50_6$,) during a failure of one of the directors while still enabling differential SCSI data transfers between the host computer and the bank of disk drives during the normal operating mode. That is, in the event of a failure of one of a pair of directors, differential SCSI data is able to be transferred between the backplane 30 and the bank of disk drives with single-ended SCSI data being transferred only through the shorter, more isolated backplane 30 only during a failure mode. Once the failure mode is detected, the failed director will be replaced and the system will revert to the full differential SCSI operating mode. It is noted that if a single-ended disk drive is used, in one of the disk drive section, for example, disk drive section $80_0$, such use is sensed and one of the conductors connected to pins $52_1$ or $52_2$ for disk drives in section $80_0$ is grounded to enable transfer of single-ended data. The same would occur if a single-ended disk drive were used in section $80_1$, in which case one of the conductors connected to pins $52_4$ or $52_5$ is grounded to enable transfer of single-ended data.

Other embodiments are within the spirit and scope of the appended claims.

What is claimed is:

1. A system for coupling data between a host computer and a bank of disk drives, such system comprising:
   a plurality of directors for controlling the flow of the data between host computer and the bank of disk drives, each one of the directors having a primary port and a secondary port;

a first I/O section coupled to a first one of a pair of disk drive sections in the bank of disk drives and a second I/O section coupled to a second one of the pair of disk drive sections in the bank of disk drives;

a backplane for electrically interconnecting:

the primary port of a first one of a pair of the directors to the first I/O section through a first differential data bus;

the secondary port of the first one of the pair of directors to the second I/O section through a first single ended data bus;

the primary port of a second one of the pair of directors to the second I/O section through a second differential data bus; and, the secondary port of the second one of the pair of directors to the first I/O section through a second single ended data bus; and wherein each one of the first and second I/O sections includes a single ended/differential data bus converter, the converter of the first I/O section being coupled between the second single-ended data bus and the first differential data bus and the converter of the second I/O section being coupled between the first single ended data bus and the second differential data bus.

2. The system recited in claim 1 wherein each one of the directors in the pair thereof includes a processor for, during a normal operating mode, coupling data between such processor and a corresponding one of the pair of disk drive sections through a corresponding one of the first and second differential buses and, in the event of a fault in the first one of the pair of directors coupling data between the second one of the pair of directors and the first one of the pair of disk drive sections through the second single-ended data buses to a first one of the pair of single ended/differential data bus converters to the first differential data bus and the first one of the disk drive sections through the first differential data buses.

3. A system interface or coupling data between a host computer and a bank of disk drives, such interface comprising:

(A) a backplane;

(B) a plurality of directors connected to one side of the backplane;

(C) an I/O interface connected to an opposite side of the backplane;

(D) such directors being adapted to control the flow of the data between host computer and the bank of disk drives, each one of the directors having: a primary port and a secondary port connected to the front side of the backplane;

(E) such I/O interface having a first section coupled to the first one of the pair of disk drive sections and a second section coupled to the second one of the pair of disk drive sections;

(F) wherein the backplane electrically interconnects:

(a) the primary port of a first one of a pair of the directors to the first section of the I/O interface through a first differential SCSI data bus;

(b) the secondary port of the first one of the pair of directors to the second section of the I/O interface through a first single ended SCSI data bus;

(c) the primary port of a second one of the pair of directors to the second section of the I/O interface through a second differential SCSI data bus; and, (d) the secondary port of the second one of the pair of directors to the first section of the I/O interface through a second single ended SCSI data bus; and, (G) wherein each one of the first and second sections of the I/O interface includes a single ended/differential SCSI data bus converter, the converter of the first section of the I/O interface being coupled between the second single ended SCSI data bus and the first differential SCSI data bus and the converter of the second section of the I/O interface being coupled between the first single ended SCSI data bus and the second differential SCSI data bus.

4. A data storage system, comprising:

(A) a host computer;

(B) a bank of disk drives comprising a plurality of disk drive sections;

(C) a system interface for coupling data between the host computer and the bank of disk drives, such interface comprising:

(a) a backplane;

(b) a plurality of directors connected to front side connectors of the backplane;

(c) an I/O interface connected to rear side connectors of the backplane;

(D) wherein such directors are adapted to control the flow of the data between host computer and the bank of disk drives, each one of the directors having: a primary port and a secondary port connected to the front side connectors of the backplane;

(E) wherein such I/O interface has a first section and a second section, the first section of the I/O interface being coupled to the first one of the pair of disk drive sections and the second section of the I/O interface being coupled to the second one of the pair of disk drive sections;

(F) wherein the backplane electrically interconnects:

(a) the primary port of a first one of a pair of the directors to the first section of the I/O interface through a first differential SCSI data bus;

(b) the secondary port of the first one of the pair of directors to the second section of the I/O interface through a first single ended SCSI data bus;

(c) the primary port of a second one of the pair of directors to the second section of the I/O interface through a second differential SCSI data bus; and, (d) the secondary port of the second one of the pair of directors to the first section of the I/O interface through a second single ended SCSI data bus; and, (G) wherein each one of the first and second sections of the I/O interface includes a single ended/differential SCSI data bus converter, the converter of the first section of the I/O interface being coupled between the second single ended SCSI data bus and the first differential SCSI data bus and the converter of the second section of the I/O interface being coupled between the first single ended SCSI data bus and the second differential SCSI data bus.

* * * * *